US009172871B2

(12) United States Patent
Zhao et al.

(10) Patent No.: US 9,172,871 B2
(45) Date of Patent: Oct. 27, 2015

(54) METHOD AND DEVICE FOR MULTI-CAMERA IMAGE CORRECTION

(71) Applicant: Huawei Device Co., Ltd., Shenzhen (CN)

(72) Inventors: Song Zhao, Shenzhen (CN); Yuan Liu, Shenzhen (CN); Jing Wang, Shenzhen (CN); Guangyao Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 406 days.

(21) Appl. No.: 13/728,380

(22) Filed: Dec. 27, 2012

(65) Prior Publication Data

US 2013/0113876 A1 May 9, 2013

Related U.S. Application Data

(63) Continuation of application No. PCT/CN2011/080218, filed on Sep. 27, 2011.

(30) Foreign Application Priority Data

Sep. 29, 2010 (CN) .......................... 2010 1 0500209

(51) Int. Cl.
*H04N 7/00* (2011.01)
*H04N 5/232* (2006.01)
(Continued)

(52) U.S. Cl.
CPC .......... *H04N 5/23238* (2013.01); *G06T 7/0018* (2013.01); *H04N 7/15* (2013.01)

(58) Field of Classification Search
CPC ......... G06F 1/20; G06F 1/203; G06F 9/4411; H04N 7/005; H04N 3/30; H04N 5/23238; H04N 7/15; G03B 37/04; G06T 3/0018; G06T 7/0018
USPC .......................................................... 348/38
See application file for complete search history.

(56) References Cited

U.S. PATENT DOCUMENTS 4,463,380 A * 7/1984 Hooks, Jr. ...................... 348/580
5,157,481 A * 10/1992 Kashimura et al. ........... 348/263
(Continued)

FOREIGN PATENT DOCUMENTS

CN 101146231 A 3/2008
CN 101267494 A 9/2008
(Continued)

OTHER PUBLICATIONS

International Search Report in corresponding PCT Patent Application No. PCT/CN2011/080218 (Jan. 5, 2012).
(Continued)

*Primary Examiner* — Shan Elahi
(74) *Attorney, Agent, or Firm* — Leydig, Voit & Mayer, Ltd.

(57) ABSTRACT

Embodiments of the present invention provide a method and a device for multi-camera image correction. The method for multi-camera image correction includes: acquiring information of independent images that are captured by each camera and have no overlap area or have an overlap area smaller than a threshold; acquiring, according to information of each independent image, an image correction parameter that corresponds to each camera and allows adjacent independent images to be corrected into a contiguous image; and performing, according to the image correction parameter, correction processing on video data of a camera that corresponds to the image correction parameter. In the embodiments of the present invention, maintenance manpower is saved, adjustment efficiency is improved, and remote maintenance may be performed in the case of no overlap area or of a small overlap area. In addition, images are corrected in a data processing manner, which efficiently ensures precision of image correction.

18 Claims, 7 Drawing Sheets

(51) Int. Cl.
  *G06T 7/00* (2006.01)
  *H04N 7/15* (2006.01)

(56) References Cited

U.S. PATENT DOCUMENTS

| | | | |
|---|---|---|---|
| 5,187,571 A * | 2/1993 | Braun et al. | 348/39 |
| 5,311,305 A * | 5/1994 | Mahadevan et al. | 348/169 |
| 5,703,961 A * | 12/1997 | Rogina et al. | 382/154 |
| 6,157,396 A * | 12/2000 | Margulis et al. | 345/506 |
| 6,340,994 B1 * | 1/2002 | Margulis et al. | 348/625 |
| 6,445,815 B1 * | 9/2002 | Sato | 382/154 |
| 6,456,340 B1 * | 9/2002 | Margulis | 348/745 |
| 2002/0003575 A1 * | 1/2002 | Marchese | 348/231 |
| 2002/0168091 A1 * | 11/2002 | Trajkovic | 382/107 |
| 2002/0196472 A1 * | 12/2002 | Enomoto | 358/3.26 |
| 2003/0031375 A1 * | 2/2003 | Enomoto | 382/255 |
| 2003/0123702 A1 * | 7/2003 | Colmenarez et al. | 382/103 |
| 2004/0061774 A1 * | 4/2004 | Wachtel et al. | 348/36 |
| 2004/0061787 A1 * | 4/2004 | Liu et al. | 348/218.1 |
| 2004/0062454 A1 * | 4/2004 | Komiya et al. | 382/284 |
| 2004/0090538 A1 | 5/2004 | Kadohara | |
| 2004/0125103 A1 * | 7/2004 | Kaufman et al. | 345/419 |
| 2004/0210754 A1 * | 10/2004 | Barron et al. | 713/153 |
| 2005/0024508 A1 * | 2/2005 | Okisu et al. | 348/254 |
| 2005/0141607 A1 * | 6/2005 | Kaplinsky | 375/240.2 |
| 2005/0169555 A1 | 8/2005 | Hasegawa | |
| 2005/0206659 A1 * | 9/2005 | Cutler | 345/660 |
| 2005/0207622 A1 * | 9/2005 | Haupt et al. | 382/118 |
| 2006/0017807 A1 * | 1/2006 | Lee et al. | 348/36 |
| 2006/0054787 A1 * | 3/2006 | Olsen et al. | 250/208.1 |
| 2006/0125921 A1 * | 6/2006 | Foote | 348/159 |
| 2006/0197853 A1 | 9/2006 | Miyashita | |
| 2006/0209194 A1 * | 9/2006 | Liu et al. | 348/218.1 |
| 2007/0041659 A1 * | 2/2007 | Nobori et al. | 382/284 |
| 2007/0076107 A1 | 4/2007 | Nishimura | |
| 2007/0188633 A1 * | 8/2007 | Mandy et al. | 348/241 |
| 2007/0236595 A1 * | 10/2007 | Pan et al. | 348/335 |
| 2008/0101724 A1 | 5/2008 | Baker et al. | |
| 2008/0225055 A1 | 9/2008 | Yu et al. | |
| 2008/0240612 A1 | 10/2008 | Liang et al. | |
| 2008/0298571 A1 * | 12/2008 | Kurtz et al. | 379/156 |
| 2009/0167923 A1 * | 7/2009 | Safaee-Rad et al. | 348/345 |
| 2009/0167930 A1 * | 7/2009 | Safaee-Rad et al. | 348/347 |
| 2010/0053303 A1 * | 3/2010 | Hayashi et al. | 348/36 |
| 2010/0097443 A1 | 4/2010 | Lanlans | |
| 2010/0157017 A1 | 6/2010 | Pepperell | |

FOREIGN PATENT DOCUMENTS

| | | |
|---|---|---|
| CN | 101404725 A | 4/2009 |
| CN | 101820550 A | 9/2010 |
| WO | WO 2010/074582 A1 | 7/2010 |

OTHER PUBLICATIONS

1$^{st}$ Office Action in corresponding Chinese Patent Application No. 201010500209.6 Jun. 27, 2013).

Extended European Search Report in corresponding European Patent Application No. 11828113.8 (Jul. 29, 2013).

Written Opinion of the International Searching Authority in corresponding PCT Patent Application No. PCT/CN2011/080218 (Jan. 5, 2012).

* cited by examiner

FIG. 1

```
┌─────────────────────────────────────────┐
│ Acquire information of independent images that are │
│ captured by each camera and have no overlap area   │── 201
│ or have an overlap area smaller than a threshold   │
└─────────────────────────────────────────┘
                    │
                    ▼
┌─────────────────────────────────────────┐
│ Acquire, according to the information of           │
│ independent images, an image correction parameter  │
│ that corresponds to each camera and allows         │── 202
│ adjacent independent images to be corrected into a │
│ contiguous image                                   │
└─────────────────────────────────────────┘
                    │
                    ▼
┌─────────────────────────────────────────┐
│ Perform, according to the image correction         │
│ parameter, correction processing on video data of a│── 203
│ camera that corresponds to the image correction    │
│ parameter.                                         │
└─────────────────────────────────────────┘
```

```
┌─────────────────────────────────────────┐
│ Send, to an image capturing system of   │
│ each camera, a capturing command for    │
│ shooting template images, and receive   │
│ information of template images exposed  │──601
│ at multiple exposure time, where the    │
│ template images are captured and sent   │
│ by each camera                          │
└─────────────────────────────────────────┘
                    │
                    ▼
┌─────────────────────────────────────────┐
│ Acquire, according to the information   │
│ of template images exposed at multiple  │──602
│ exposure times, a color correction      │
│ parameter corresponding to each camera  │
└─────────────────────────────────────────┘
                    │
                    ▼
┌─────────────────────────────────────────┐
│ Determine a color look up table         │
│ according to the color correction       │
│ parameter, and perform correction       │──603
│ processing on the video data according  │
│ to the look up table                    │
└─────────────────────────────────────────┘
```

METHOD AND DEVICE FOR MULTI-CAMERA IMAGE CORRECTION

CROSS-REFERENCE TO RELATED APPLICATIONS

This application is a continuation of International Patent Application No. PCT/CN2011/080218, filed on Sep. 27, 2011, which claims priority to Chinese Patent Application No. 201010500209.6, filed on Sep. 29, 2010, both of which are hereby incorporated by reference in their entireties.

FIELD OF TECHNOLOGY

Embodiments of the present invention relate to image technologies, and in particular to a method and a device for multi-camera image correction.

BACKGROUND

In a remote conference system such as a Telepresence system, multiple cameras are needed to present pictures of conference sites from various angles, so that conference participants can feel at the same conference site, thereby ensuring consistency of feeing in different conference sites.

Figure 1:
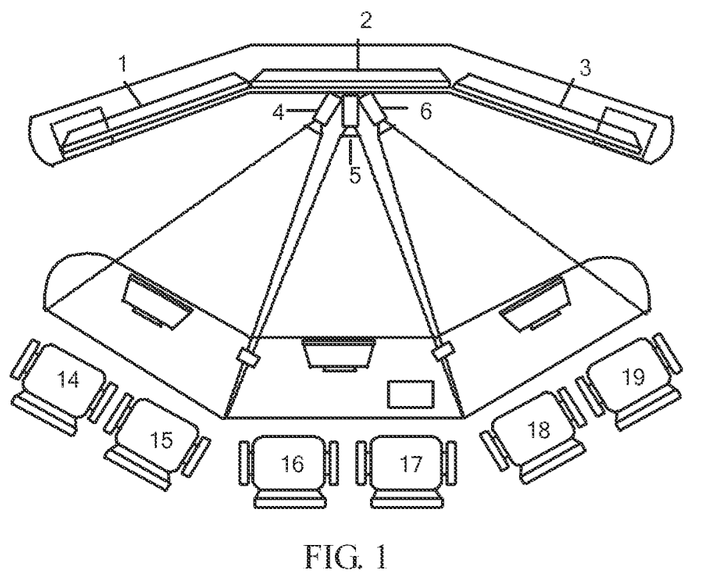
FIG. 1 is a schematic diagram of a layout of a conference room system in the prior art.

FIG. 1 is a schematic diagram of a layout of a conference room system in the prior art. As shown in FIG. 1, the system may use three flat-panel displays 1, 2, and 3. The three displays are used to present high-definition pictures with the size approximating to true-to-life dimensions. The three displays are placed in a folded surface manner, where display 2 in the middle is close to displays 1 and 3. Images on the three displays form complete presence of a scene of the conference room. At the position of display 2 in the middle, three high-definition cameras 4, 5, and 6 are arranged. The three cameras are arranged in a convergence manner. An adjustment to positions of the three cameras may allow a shooting range of each of the cameras to just cover one area of a conference table. For example, camera 4 corresponds to the area of seats 14 and 15, camera 5 corresponds to the area of seats 16 and 17, and camera 6 corresponds to the area of seats 18 and 19. Therefore, three images shot by three cameras are spliced to a panoramic picture of the scene of the conference room. As may be seen from the above, images that may be spliced seamlessly can be obtained only at a place where shooting angles of each two cameras intersect. An area before an intersecting point is a missed area that cannot be shot by the cameras, whereas an area after the intersecting point is an overlap area. Geometric correction and color correction needs to be performed on images shot by the three cameras to allow the images shot by the three cameras to be consistent in geometric position, color, and brightness. In the case of a large overlap area, geometric correction and color correction may be performed on images by placing a template in the overlap area or detecting geometric characteristics of an existing feature in the overlap area in the prior art. In the case of no overlap area or of a small overlap area, geometric correction and color correction may be performed on images only by manually adjusting mechanical positions of cameras and brightness/color parameters of the cameras in the prior art. For the latter case, maintenance personnel need be onsite for adjustment. Therefore, the adjustment efficiency is low and it is difficult to ensure precision of the geometric correction and that of the color correction.

SUMMARY

Embodiments of the present invention provide a method and a device for multi-camera image correction.

An embodiment of the present invention provides a method for multi-camera image correction, including:

acquiring information of independent images that are captured by each camera and have no overlap area or have an overlap area smaller than a threshold;

acquiring, according to information of each independent image, an image correction parameter that corresponds to each camera and allows adjacent independent images to be corrected into a contiguous image; and performing, according to the image correction parameter, correction processing on video data of a camera that corresponds to the image correction parameter.

An embodiment of the present invention provides a device for multi-camera image correction, including:

an acquiring module, configured to acquire information of independent images that are captured by each camera and have no overlap area or have an overlap area smaller than a threshold; and acquire, according to information of each independent image, an image correction parameter that corresponds to each camera and allows adjacent independent images to be corrected into a contiguous image; and a processing module, configured to perform, according to the image correction parameter acquired by the acquiring module, correction processing on video data of a camera that corresponds to the image correction parameter.

In the embodiments of the present invention, in the case of no overlap area or of a small overlap area, geometric correction and color correction do not need to be performed on images by manually adjusting mechanical positions of cameras and brightness/color parameters of the cameras. Instead, offline and online processing are performed on images shot by the cameras, by using an image processing method such as image data collection and correction. Therefore, in the embodiments of the present invention, maintenance manpower is saved, adjustment efficiency is improved, and remote maintenance may be performed. In addition, images are corrected in a data processing manner, which efficiently ensures precision of image correction.

BRIEF DESCRIPTION OF THE DRAWINGS

To illustrate the technical solutions in the embodiments of the present invention or in the prior art more clearly, the following briefly describes the accompanying drawings needed for describing the embodiments or the prior art. Apparently, the accompanying drawings in the following description show some embodiments of the present invention, and persons skilled in the art may derive other drawings from these accompanying drawings without creative efforts.

DETAILED DESCRIPTION

To make the objectives, technical solutions, and advantages of the present invention more comprehensible, the following clearly describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons skilled in the art based on the embodiments of the present invention without creative efforts shall fall within the protection scope of the present invention.

Figure 2:
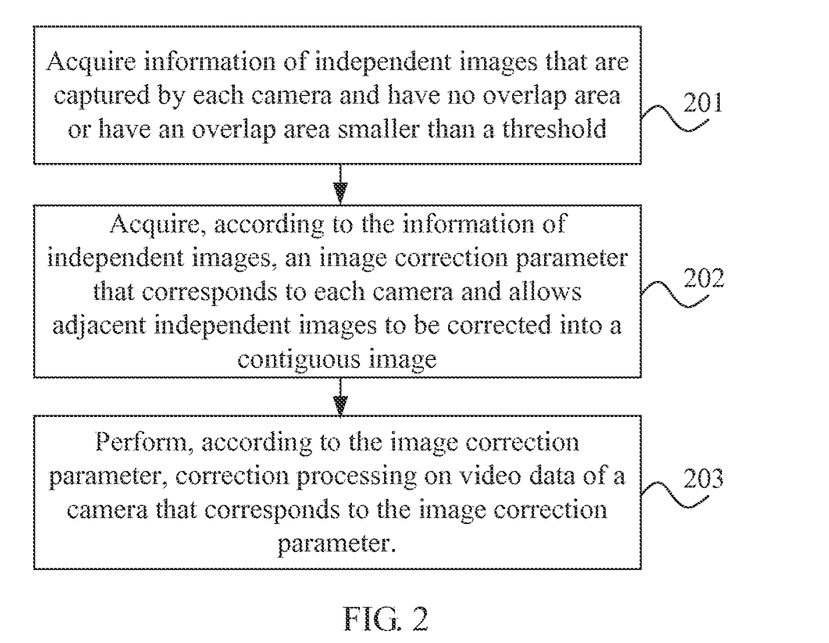
FIG. 2 is a flowchart of a method for multi-camera image correction according to Embodiment 1 of the present invention.

FIG. 2 is a flowchart of a method for multi-camera image correction according to a first embodiment of the present invention. As shown in FIG. 2, in the case without an overlap area or of a small overlap area, correction processing may be performed by using an image processing device for images shot by each camera in this embodiment. Specifically, the image processing device in this embodiment may include an online processing device and an offline processing device. The method in this embodiment may include:

Step 201: Acquire information of independent images that are captured by each camera and have no overlap area or have an overlap area smaller than a threshold.

Specifically, the offline processing device may send a capturing command to an image capturing system which each camera belongs to, and receive information of independent images that are captured and sent by the image capturing system which each camera belongs to, thereby acquiring information of independent images that are captured by each camera and have no overlap area or have an overlap area smaller than a threshold. Therefore, no overlap or a small-range overlap exists between images captured by each camera. Persons skilled in the art may set a threshold of an overlap range of the overlap area as needed. For example, the threshold may be set to 5%-10% of a horizontal resolution of a total area.

Step 202: Acquire, according to the information of independent images, an image correction parameter that corresponds to each camera and allows adjacent independent images to be corrected into a contiguous image.

Generally, image correction processing may include brightness and color correction and geometric correction of images and other subsequent image correction processing. Therefore, the image correction parameter in this embodiment may be a color correction parameter used to perform brightness and color correction on images, a geometric correction parameter used to perform geometric correction on images, and another image correction parameter, which is not limited in this embodiment.

In this embodiment, the offline processing device may acquire, according to the information of independent images that are captured by each camera, a geometric correction parameter and/or a color correction parameter corresponding to each camera. The acquired geometric correction parameter may be used to correct adjacent independent images into an image that is contiguous in geometric position. The acquired color correction parameter may be used to correct adjacent independent images into an image that is contiguous in color and brightness.

Step 203: Perform, according to the image correction parameter, correction processing on video data of a camera that corresponds to the image correction parameter.

After the offline processing device acquires the image correction parameter, the online processing device may perform frame-by-frame real-time processing on video data of a corresponding camera according to the image correction parameter such as the geometric correction parameter and/or the color correction parameter.

It should be noted that an offline processing device and an online processing device in each embodiment of the present invention are for an exemplary purpose rather than a defining purpose. The function of the online processing device may also be implemented by the offline processing device, and vice versa. In each embodiment of the present invention, whether the image processing device adopts an online processing device or an offline processing device is determined according to a practical requirement of image processing. For example, an online processing device is preferentially adopted in image processing with a relatively high timeliness requirement, whereas an offline processing device is preferentially adopted in image processing with a relatively low timeliness requirement and a relatively high quality requirement.

An algorithm for an online processing part is relatively simple but has a high timeliness requirement. Therefore, the online processing device may be implemented in a manner of digital signal processing (Digital Signal Processing, DSP for short), programmable logic device (Programmable Logic Device, PLD for short), field programmable gate array (Field Programmable Gate Array, FPGA for short), or graphic processing unit (Graphic Processing Unit, GPU for short), or the like. The offline part has no timeliness requirement but the algorithm is complex. Therefore, the offline processing device is suitable to be implemented by adopting a CPU-based computer. The online processing device and the offline processing device are only logical entities. The two devices may belong to different physical devices and communicate with each other through a data transmission interface. For example, the data transmission interface may adopt an interface manner such as Ethernet and USB, and a transmission protocol may adopt the File Transfer Protocol (File Transfer Protocol, FTP for short), the HyperText Transfer Protocol (HyperText Transfer Protocol, HTTP for short), the Transmission Control Protocol/Internet Protocol (Transmission Control Protocol/Internet Protocol, TCP/IP for short), the USB protocol, or the like. The two devices may also be located in a same physical device. For example, a PC is adopted as the online processing device and the offline processing device, where a CPU acts as the offline device to calculate a parameter and a GPU acts as the online processing device to perform real-time image processing.

In this embodiment, in the case of no overlap area or of a small overlap area, geometric correction and color correction do not need to be performed on images by manually adjusting mechanical positions of cameras and brightness/color parameters of the cameras. Instead, offline and online processing are performed on images shot by the cameras, by using an image processing method such as image data collection and correction. Therefore, in this embodiment, maintenance manpower is saved, adjustment efficiency is improved, and remote maintenance may be performed. In addition, images are corrected in a data processing manner, which efficiently ensures precision of image correction.

Technical solutions of the present invention are described in detail regarding processing processes of geometric correction and color correction.

Figure 3:
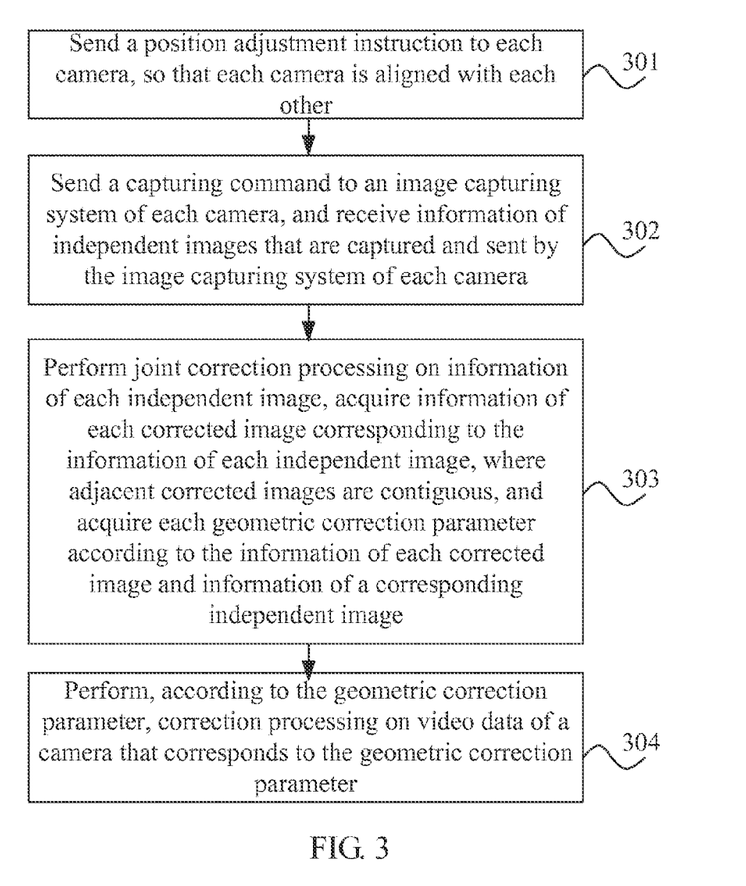
FIG. 3 is a flowchart of a method for multi-camera image correction according to Embodiment 2 of the present invention.

FIG. 3 is a flowchart of a method for multi-camera image correction according to Embodiment 2 of the present invention. As shown in FIG. 3, in this embodiment, geometric correction processing may be performed on images shot by multiple cameras. The method in this embodiment may include:

Step 301: Send a position adjustment instruction to each camera, so that each camera is aligned with each other.

In a Telepresence system, a process of geometric correction processing is used to solve a problem of splicing and alignment of images of multiple cameras in geometric position to ensure that images of multiple cameras are contiguous in geometric position.

Geometric correction of multiple cameras may be divided into two phases: rough correction phase and precise correction phase. Step 301 is a rough correction phase. In step 301, an adjustment instruction is sent to multiple cameras, so that the multiple cameras are roughly aligned with each other in vertical and horizontal positions. An adjustment to a camera may be a full-sphere movement of a positioning screw, a pan tilt zoom, or the like of the camera, and lens zoom and focus control. During the adjustment, a reference camera such as a camera in the middle may be selected first. The reference camera is adjusted to achieve an ideal effect. Then, other cameras are adjusted to be approximately aligned with the reference camera.

It should be noted that step 301 may also be skipped. For example, a geometric relationship between cameras is determined by fixing positions of the cameras. In this way, a structural position adjustment does not need to be performed on the cameras. Because positions of the cameras cannot be adjusted, position precision of the fixed cameras needs to be within an adjustable range of the next step of precise correction.

Step 302: Send a capturing command to an image capturing system which each camera belongs to, and receive information of independent images that are captured and sent by the image capturing system which each camera belongs to.

Step 303: Perform joint correction processing on information of each independent image, acquire information of each corrected image corresponding to the information of each independent image, where adjacent corrected images are contiguous, and acquire each geometric correction parameter according to the information of each corrected image and information of a corresponding independent image.

The joint correction processing is selecting one image from information of each independent image as base image information, performing correction processing on the base image information, and using the base image information, which the correction processing has been performed on, as reference image information to perform correction processing on information of each of other independent images.

After rough correction in step 301, step 302 and step 303 are precise geometric correction, where images of multiple cameras are precisely aligned with each other by using a method of image warping. Geometric transformation operations include translation, rotation, scaling, perspective transformation, and the like.

For example, an offline processing device may instruct each camera to capture one frame of image, where each frame of image corresponds to one camera that needs to be corrected. The image capturing command may be sent over a network, and information of captured independent images is obtained through network transmission. The offline processing device may perform joint correction processing according to the information of captured independent images.

When performing specific operations of joint correction processing, the offline processing device may select an image of one camera as a base image, correct the base image first, then correct other images so that other images are aligned with the base image, and finally acquire a wide viewing angle image that is visually contiguous and consistent.

Figure 4:
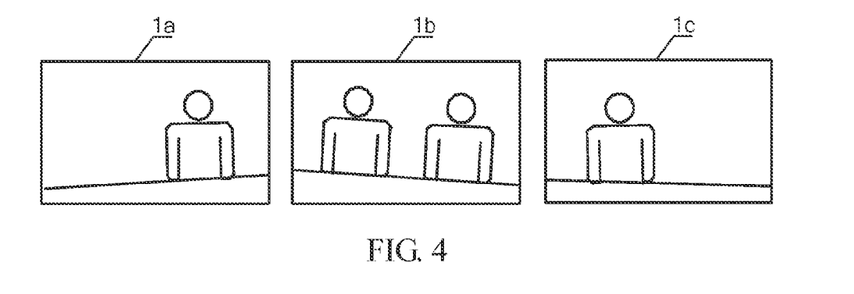
FIG. 4 is a schematic diagram before image correction is performed by using the method according to Embodiment 2 shown in FIG. 3.
Figure 5:
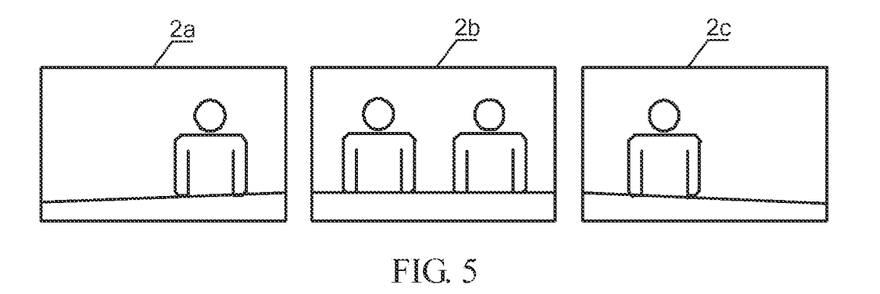
FIG. 5 is a schematic diagram after image correction is performed by using the method according to Embodiment 2 shown in FIG. 3.

FIG. 4 is a schematic diagram before image correction is performed by using the method according to Embodiment 2 shown in FIG. 3. FIG. 5 is a schematic diagram after image correction is performed by using the method according to Embodiment 2 shown in FIG. 3. As shown in FIGS. 4 and 5, image 1b in the middle is used as a base image. As may be seen from the desktop edge in the middle image, there is small-angle rotation in the middle image 1b, resulting in that the whole image inclines. Therefore, the offline processing device may perform reverse rotation to change the desktop edge to be horizontal. The corrected middle image is shown in 2b. After the transformation of the base image is completed, the offline processing device may also transform images 1a and 1c on the left and right, that is, perform transformation operations such as rotation and translation, so that after the transformation, desktop edges in images 2a and 2c are aligned and keep a geometrically contiguous relationship with the desktop edge in image 2b.

During practical correction, some auxiliary means may be used to assist the offline processing device in more easily performing judgment on how to adjust an image, thereby improving correction speed and precision. For example, some templates such as checker boards may be placed in a Telepresence scenario during image shooting, so that each camera shoots one part of the templates. In this way, the templates may be used as reference objects during image alignment. In addition, during implementation of geometric correction, some measurement functions may be provided to measure a correction effect. For example, a distance detection function is provided to measure the degree of alignment of desktop edges in multiple images, or an area detection function is provided to measure whether the size of an object that is at the same position for each camera is the same in images, so as to detect whether focal length settings of cameras are the same.

The offline processing device may adopt different correction parameters to perform correction such as rotation transformation on the information of independent images of each camera until a satisfied degree is achieved. Then, the offline processing device may obtain a geometric correction parameter of information of each independent image. The geometric correction parameter is a parameter needed for an online processing device to perform frame-by-frame image transformation.

Step 304: Perform, according to the geometric correction parameter, correction processing on video data of a camera that corresponds to the geometric correction parameter.

After receiving the geometric correction parameter, the online processing device may perform correction processing on video data of a camera that corresponds to the geometric correction parameter.

This embodiment provides a specific implementation manner of image transformation for more clearly describing the process of joint correction processing.

According to a projective geometry theory, a transformation relationship in a projection of a three-dimensional point in the space onto a camera imaging plane is as follows:

$$\bar{x} = K[R\,|\,t]X \quad (1)$$

$$K = \begin{bmatrix} f_x & s & u_0 \\ 0 & f_y & v_0 \\ 0 & 0 & 1 \end{bmatrix} \quad (2)$$

where $\bar{x}$ is a homogeneous representation of a plane coordinate; X is a homogeneous representation of a world coordinate system; $f_x$ and $f_y$ are equivalent focal lengths in horizontal and vertical directions; s is a distortion coefficient of an image; $u_0$, $v_0$ is a coordinate of a principal point of the image; R is a rotation matrix of a camera; t is a translation vector of the camera; and K is an internal parameter of the camera, whereas R and t are external parameters of the camera. For multiple images that are shot by two cameras or shot by one camera at different positions and have an overlap area, an imaging relationship between two images of a point on a certain plane in the space is as follows:

$$x' = Hx = \begin{bmatrix} h_{11} & h_{12} & h_{13} \\ h_{21} & h_{22} & h_{23} \\ h_{31} & h_{32} & h_{33} \end{bmatrix} x \quad (3)$$

where H is a 3×3 matrix with a degree of freedom being 8, represents a transformation relationship between two imaging planes, and is referred to as a homography transformation matrix; x is a homogeneous representation of an image coordinate before the transformation; and x' is a homogeneous representation of the image coordinate after the transformation. For camera systems that approximately perform pure rotation or camera systems that approximately share an optical center, H may be represented as:

$$H \approx K'R'R^{-1}K^{-1} \quad (4)$$

With a point pair coordinate on an image before and after transformation known, two equations may be obtained:

$$x' = \frac{h_{11}x + h_{12}y + h_{13}}{h_{31}x + h_{32}y + h_{33}} \quad (5)$$

$$y' = \frac{h_{21}x + h_{22}y + h_{23}}{h_{31}x + h_{32}y + h_{33}}$$

The degree of freedom of H is 8. Therefore, the homography matrix H may be evaluated by using at least eight equations that are established by using four pairs of points. Regarding the method of manual correction, a user selects coordinates of at least four points on an image before transformation and coordinates of the four points on the image after the transformation. According to the coordinates of the four pairs of points, we may use equation (5) to establish a group of equations including at least eight equations to evaluate the homography matrix H. After obtaining the homography matrix H, we may multiply coordinates of images with H to perform perspective transformation, so that, the images are aligned after the perspective transformation. It should be noted that perspective transformation can only ensure that one plane in the images achieves a relatively good alignment effect. If a range of depth of field in the images is relatively large, alignment cannot be achieved in all depths of field. In the Telepresence system, a viewer is most sensitive to a position of a person. Therefore, we only need to ensure a best splicing and alignment effect of an area that approximates to a plane and is perpendicular to a desktop edge and where the face and body of a person are located. In addition, a person is also relatively sensitive to cross-screen geometric structures, for example, desktop edges. Therefore, it needs to be ensured that these geometric structures are precisely aligned during image correction.

As the evaluation of the homography matrix H is relatively complex, in the case of a slight image change, affine transformation may be performed to simulate perspective transformation. The following transformation formula may be adopted:

$$x' = S[R|T]x \quad (6)$$

where $$S = \begin{bmatrix} s_x & 0 \\ 0 & s_y \end{bmatrix}, R = \begin{bmatrix} \cos\theta & -\sin\theta \\ \sin\theta & \cos\theta \end{bmatrix}, \text{ and } T = \begin{bmatrix} t_x \\ t_y \end{bmatrix}.$$

S is an image scaling matrix, $s_x$ is a scaling factor in the X direction, $s_y$ is a scaling factor in the Y direction, R is a two-dimensional rotation matrix, $\theta$ is an image rotation angle, T is a translation vector, $t_s$ is a translation vector in the X direction, $t_y$ is a translation vector in the Y direction, x is a homogeneous representation of an image coordinate before the transformation, and x' is a homogeneous representation of the image coordinate after the transformation.

The online processing device does not directly perform image transformation by using the transformation parameters. Instead, the offline processing device uses the parameters to calculate the coordinate $(\bar{x}', \bar{y}')$ of a point on an original image, in which the coordinate corresponds to the coordinate (x', y') of each pixel point on the image after transformation, and obtains an image transformation mapping table according to the difference value $(\bar{x}'-x', \bar{y}'-y')$. The offline processing device sends the image transformation mapping table to the online processing device. The online processing device performs pixel-by-pixel mapping according to the image transformation mapping table and performs interpolation to obtain a transformed image. The interpolation manner may adopt multiple manners such as bilinear interpolation and cubic convolution interpolation. For example, if the bilinear interpolation manner is used, the interpolation formula is:

$$I(i+u, j+v) = [1-u \quad u]\begin{bmatrix} I(i,j) & I(i,j+1) \\ I(i+1,j) & I(i+1,j+1) \end{bmatrix}\begin{bmatrix} 1-v \\ v \end{bmatrix} \quad (7)$$

where I is an RGB value of an original image pixel, i, j is an integer pixel coordinate, and u, v is a fractional pixel coordinate.

In this embodiment, in the case of no overlap area or of a small overlap area, geometric correction does not need to be performed on images by manually adjusting mechanical positions of cameras. Instead, offline and online processing are performed on images shot by the cameras, by using an image processing method such as image data collection and correction. Therefore, in this embodiment, maintenance manpower is saved, adjustment efficiency is improved, and remote maintenance may be performed. In addition, images are corrected in a data processing manner, which efficiently ensures precision of image correction.

Figure 6:
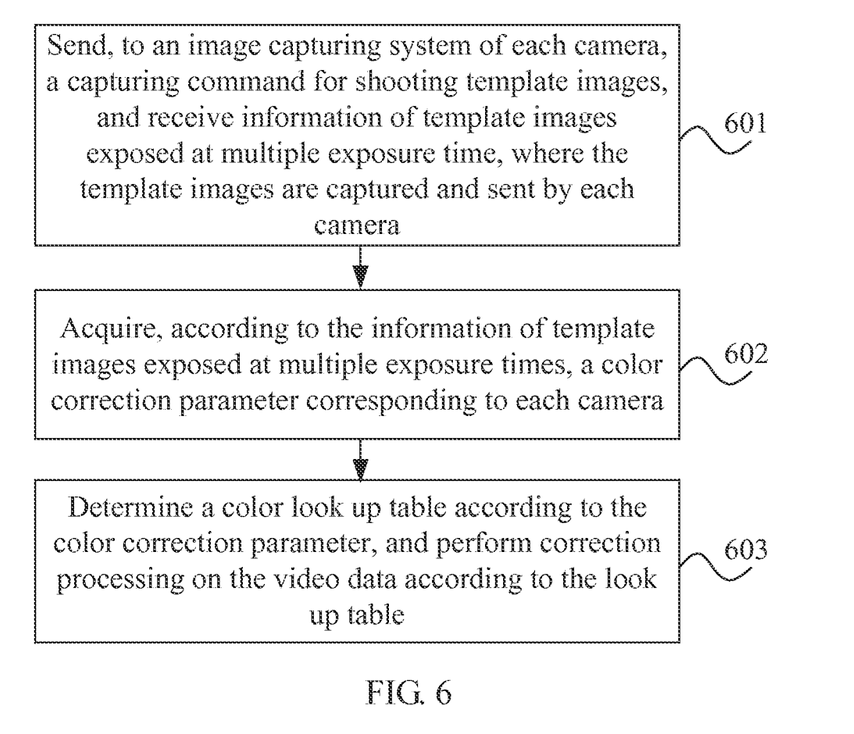
FIG. 6 is a flowchart of a method for multi-camera image correction according to Embodiment 3 of the present invention.

FIG. 6 is a flowchart of a method for multi-camera image correction according to Embodiment 3 of the present invention. As shown in FIG. 6, in this embodiment, color correction processing may be performed on images shot by multiple cameras. The method in this embodiment may include:

Step 601: Send, to an image capturing system which each camera belongs to, a capturing command for shooting template images, and receive information of template images exposed at multiple exposure time, where the template images are captured and sent by each camera.

In a Telepresence system, brightness and color correction for multiple cameras mainly aims to eliminate a difference between images of multiple cameras in brightness and color, so as to ensure consistency of multiple images in brightness and color. A traditional method of brightness and color correction for multiple cameras is processing final digital image signals. However, brightness and color differences between images of multiple cameras are essentially a mixture of a difference between different image sensor optical properties of multiple cameras and a difference between signal processing circuits of multiple cameras. Apparently, it is difficult to eliminate this mixed difference through simple image processing. In addition, at present, there are many cameras using high-resolution charge-coupled device (Charge-coupled Device, CCD for short) sensors. Because of limitations of characteristics and a manufacturing process of a CCD, a high working efficiency cannot be achieved, but high-speed video stream data with a large amount of data needs to be output. Therefore, a partition-based parallel output technology is adopted for a single CCD. For example, data of a frame of image is divided into 2-way or 4-way parallel outputs, and each output uses a separate output circuit and analog-to-digital conversion chip. Differences between output circuits, analog-to-digital conversion chips, and circuits of the CCD lead to a slight difference of multiple ways of images that are output in parallel by the CCD between partitions, that is, a difference inside a single camera.

Therefore, in this embodiment, an offline processing device may perform brightness and color correction processing between multiple cameras and inside each camera.

Figure 7:
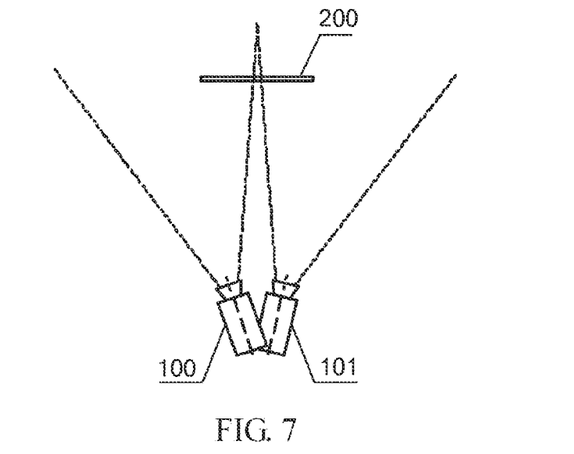
FIG. 7 is a schematic diagram of a scenario where multi-camera correction is performed in the method according to Embodiment 3 shown in FIG. 6.
Figure 8:
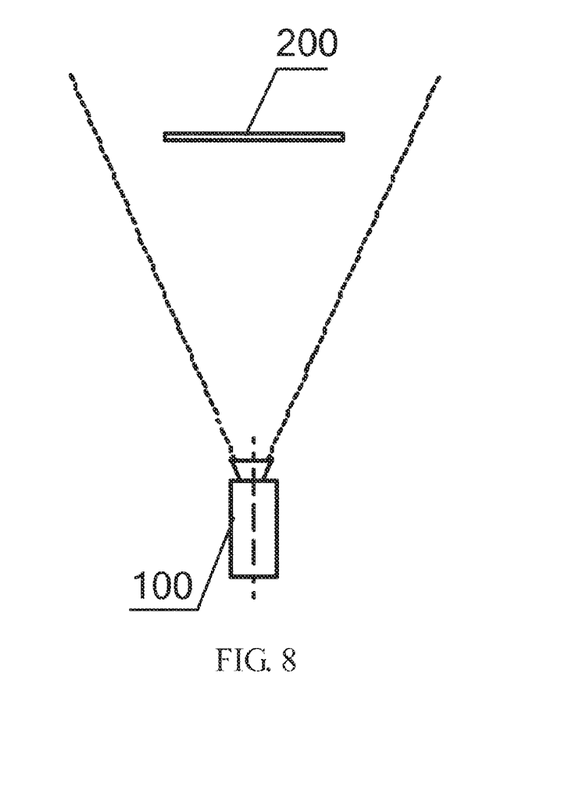
FIG. 8 is a schematic diagram of a scenario where correction is performed inside a single camera in the method according to Embodiment 3 shown in FIG. 6.

FIG. 7 is a schematic diagram of a scenario where multi-camera correction is performed in the method according to Embodiment 3 shown in FIG. 6. As shown in FIG. 7, 100 and 101 are cameras to be corrected. 200 is a correction template, and a part of 200 is shot by cameras 100 and 101 each. Calibration template 200 may be a whiteboard or a template with multiple gray levels. FIG. 8 is a schematic diagram of a scenario where correction is performed inside a single camera in the method according to Embodiment 3 shown in FIG. 6. As shown in FIG. 8, a correction template is completely within the shooting range of camera 100. During shooting, uniform illumination is required in an experimental environment. This requirement may be ensured by performing measurement on the surface of the template by using a luminance meter, or by using a special light box with uniform illumination. In addition, it is better to use a direct current lamp for illumination in the experimental environment. If an alternating current lamp is used, a capturing frequency of a camera needs to be synchronized with a light frequency, so that it may be ensured that a flicker phenomenon may not occur during shooting. It is better that a camera be in a defocus state or shooting be performed with lens removed. In addition, images of cameras in a full-black environment need to be captured, so as to obtain black level of RGB components of image sensors of the cameras.

Step 602: Acquire, according to the information of template images exposed at multiple exposure times, a color correction parameter corresponding to each camera.

For correction performed between image partitions inside each camera, step 602 may specifically be as follows: acquire, according to the information of template images exposed at multiple exposure time, levels of color component values of adjacent image areas between multiple image partitions inside each camera in each exposure time; perform interpolation processing on the levels of color component values of each image area in each exposure time to acquire a grading curve of color component values of each image partition in each exposure time; and acquire a color correction parameter of each image partition inside each camera according to a target curve and the grading curve of color component values.

For correction performed on images of adjacent areas between multiple cameras, step 602 may specifically be as follows: acquire levels of color component values of each adjacent image area between each camera in each exposure time according to the information of template images exposed at multiple exposure time; perform interpolation processing on the levels of color component values of each image area in each exposure time to acquire a grading curve of color component values of each camera in each exposure time; and acquire a color and brightness correction parameter of each camera according to a target curve and the grading curve of color component values.

Figure 9:
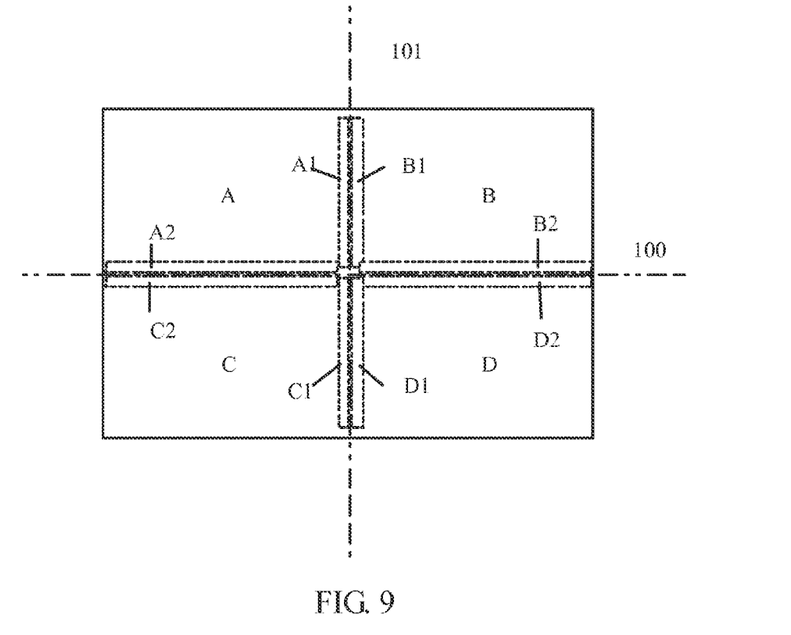
FIG. 9 is a schematic diagram of image correction inside a single camera in the scenario shown in FIG. 8.

FIG. 9 is a schematic diagram of image correction inside a single camera in the scenario shown in FIG. 8. As shown in FIG. 9, taking data of four partitions of a single camera as an example and assuming that a white template is shot, the offline processing device may instruct each camera to perform shooting to acquire information of a group of template images with different exposure time. Exposure time of cameras is different. Therefore, brightness of shot images varies depending on exposure time. For extremely long exposure time, an overexposed image that is approximately pure white may be obtained. For extremely short exposure time, an image that is approximately full black may be obtained.

For information of a template image with each exposure time, there are four image partitions A, B, C, and D, and each of the image partitions is different in brightness and color. In addition, the brightness and color inside each of the image partitions are not uniform because of impacts of factors such as an image sensor itself and a lens. To minimize the difference at boundaries of each image partition after correction, the offline processing device may instruct cameras to sample areas A1, A2, B1, B2, C1, C2, D1, and D2 that are adjacent to boundaries of image partitions. Each image partition has a vertical boundary and a horizontal boundary. Therefore, the effects of the vertical boundary and horizontal boundary need to be taken into account during processing. For example, for partition A, a rectangular area is selected as a sampling area, averages of color component values of vertical and horizontal sampling areas A1 and A2 are calculated respectively, and then an average of the averages of A1 and A2 is evaluated to obtain the RGB value of partition A.

$$\overline{C}_A = \frac{\overline{C}_{A1} + \overline{C}_{A2}}{2}$$

$$C \in \{R, G, B\}$$

where $\overline{C}_{A1}$ and $\overline{C}_{A2}$ are averages of sampling pixel RGB values of the vertical area and the horizontal area respectively, and $\overline{C}_A$ is the RGB value of partition A before the correction, where the RGB value is obtained through calculation. Similarly, for partitions B, C, and D, $\overline{C}_B$, $\overline{C}_C$, and $\overline{C}_D$ may be obtained. In this way, a series of RGB values of different partitions in different exposure time may be obtained. Because there is a difference between partitions, RGB values of different image partitions in certain exposure time are different. Brightness and color correction aims to enable RGB values of image partitions in different exposure times to be approximately consistent after the correction.

Figure 10:
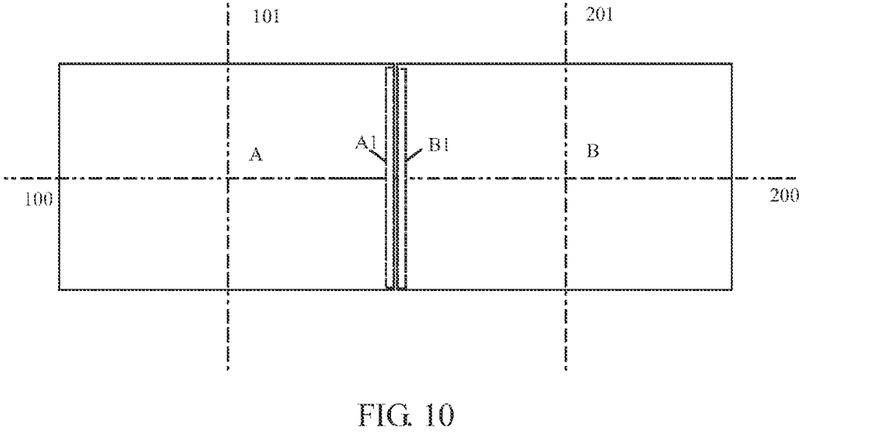
FIG. 10 is a schematic diagram of image correction between multiple cameras in the scenario shown in FIG. 7.

FIG. 10 is a schematic diagram of image correction between multiple cameras in the scenario shown in FIG. 7. As shown in FIG. 10, the method of color correction between multiple cameras is similar to the method of color correction for multiple image partitions inside a single camera. A different is that edge data of images of cameras needs to be obtained during data sampling, and then data of each camera may be processed as data of an image partition. For example, for images A and B of two cameras, rectangular areas A1 and B1 are sampled, and then RGB values before correction are calculated separately.

It should be noted that if the offline processing device needs to perform both color correction processing on each image partition inside a single camera and color correction processing between multiple cameras, color correction processing should be performed on each image partition inside a single camera first, and then color correction processing is performed between multiple cameras based on corrected image data.

Figure 11:
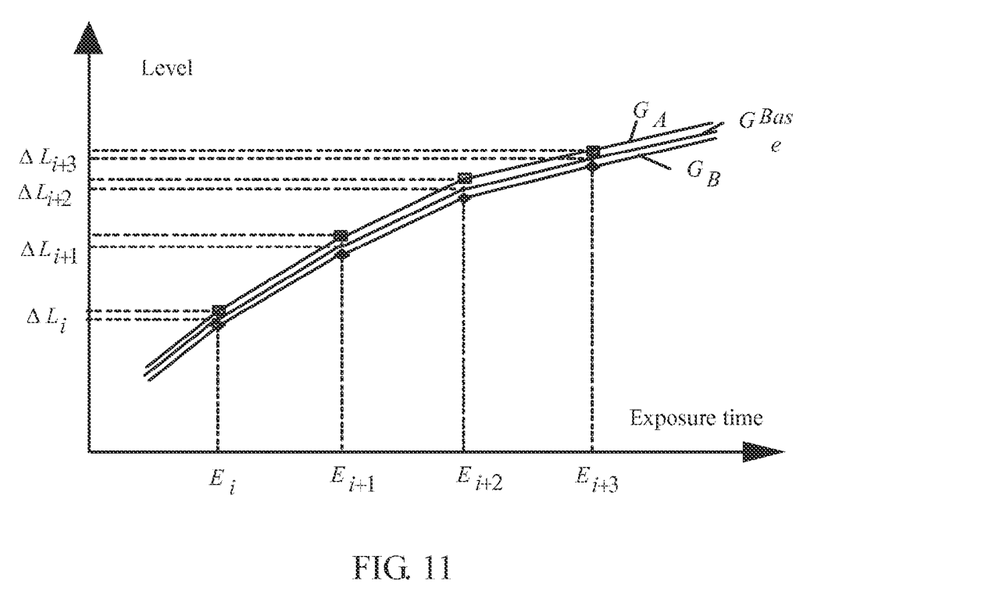
FIG. 11 is a schematic diagram of a grading curve and a target curve of color component values for correction between multiple cameras in the scenario shown in FIG. 7.

FIG. 11 is a schematic diagram of a grading curve and a target curve of color component values for correction between multiple cameras in the scenario shown in FIG. 7. As shown in FIG. 11, through the preceding processing, the offline processing device may acquire levels (Level) of RGB color components of each image in different exposure tune $E_i$, $E_{i+1}$, $E_{i+2}$, $E_{i+3}$ .... In this embodiment, the green component G is taken as an example. Its distribution curves are $G_A$ and $G_B$, where A and B are serial numbers of cameras. The offline processing device may obtain a target curve $G_{Base}$ through calculation by using $G_A$ and $G_B$, and may also directly select $G_A$ or $G_B$ as the target curve. Calibration aims to enable other curves to fit $G_{Base}$ as much as possible. $\Delta L_i$ in FIG. 11 indicates a deviation of $G_{Base}$ from the target curve $G_{Base}$. For the target curve $G_{Base}$ obtained through calculation, a value of each point on $G_{Base}$ may be obtained by performing averaging on values of corresponding points on $G_A$ and $G_B$.

Figure 12:
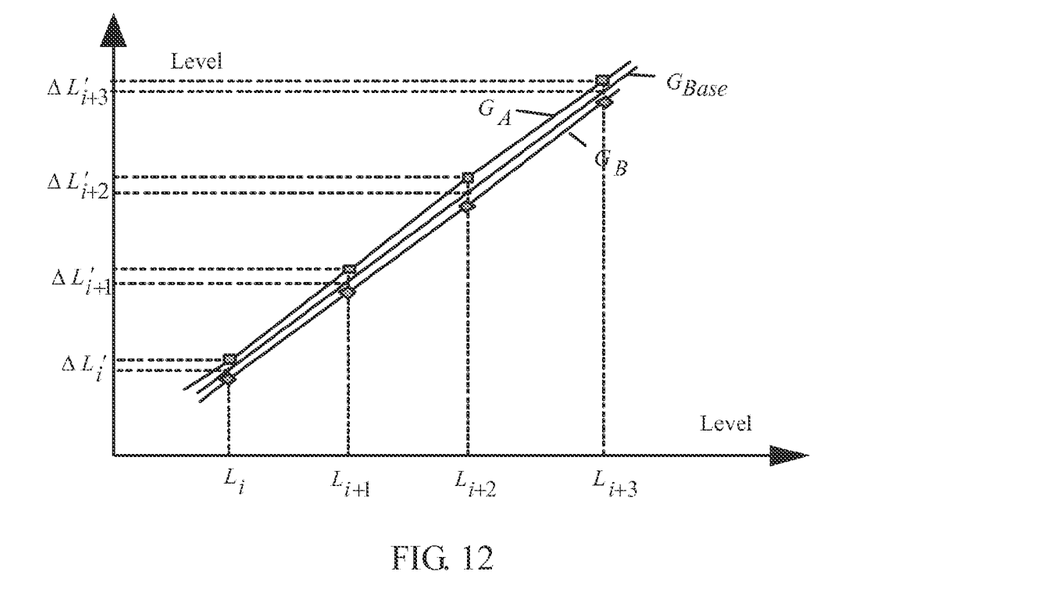
FIG. 12 is another schematic diagram of a grading curve and a target curve of color component values for correction between multiple cameras in the scenario shown in FIG. 7.

FIG. 12 is another schematic diagram of a grading curve and a target curve of color component values for correction between multiple cameras in the scenario shown in FIG. 7. As shown in FIG. 12, for correction for multiple image partitions of a single camera, the offline processing device may also select distribution of a color component such as component G as a pixel reference distribution curve $G_{Base}$. $G_{Base}$ may be distribution of component G of a certain camera, and may also be acquired through calculation by using the method for calculating the target curve $G_{Base}$. The abscissa and ordinate in FIG. 12 are levels of component G. The abscissa is Level which is a reference level of component G, that is, $L_i$ is a value in the range of 0-255. The ordinate is a level of component G of another image partition or camera. In this way, distribution curves $G_A$ and $G_B$ of levels of component G of different partitions or different cameras may be drawn. In this case, $G_{Base}$ is a 45-degree diagonal.

Therefore, for A, differences $\Delta L'_i$, $\Delta L_{i+1}'$, $\Delta L_{i+2}'$, $\Delta L_{i+3}'$ ... between component G at each exposure time point on curve $G_A$ and that on curve $G_{Base}$ are differences that need to be corrected. The value $G'_{Ai}$ of a certain point on curve $G_A$ after the correction may be represented as $G'_{Ai} k_i G_{Ai}$. Under an ideal condition, $G'_{Ai} = G_{Basei}$. Because $G'_{Ai}$ and $G_{Ai}$ are known, a color correction parameter $k_i$ may be obtained through calculation. Because points captured in an experiment are limited, it is impossible to cover each level between 0 and 225. Therefore, the offline processing device may perform interpolation between each sampling point to obtain a correction coefficient $k_i$ of each level. An interpolation algorithm may adopt a linear interpolation algorithm or another interpolation algorithm.

It should be noted that the preceding content is only description regarding component G. Persons skilled in the art should understand that component R and component B may also be processed by using the same method. In addition, FIG. 11 and FIG. 12 illustrate in detail only a solution of correction for multiple cameras. Persons skilled in the art should understand that correction processing for multiple image partitions inside a single camera is similar. Therefore, details are not repeated here.

Step 603: Determine a color look up table according to the color correction parameter, and perform correction processing on the video data according to the look up table.

After the offline part of the correction algorithm is completed, the offline processing device may output one or more color look up tables (Look Up Table, LUT for short) to an online processing device. The look up table records a mapping between original levels and levels after correction of three RGB channels of each camera or each image partition of a camera. Table 1 is a color look up table in the method for multi-camera image correction in the present invention.

TABLE 1

| 1. | |
|---|---|
| Original Level | Level After Calibration |
| 0 | 15 |
| 1 | 15 |
| 2 | 15 |
| ... | ... |
| 32 | 34 |
| 33 | 36 |
| ... | ... |
| 254 | 255 |
| 255 | 255 |

In Table 1, original levels of extreme darkness are all corrected to a value of black level. The offline processing device sends the look up table to the online processing device. The online processing device performs frame-by-frame brightness/color correction according to the look up table. During the frame-by-frame correction processing by the online processing device, only a table look up operation needs to be performed according to the look up table to replace an original RGB value of each pixel with an RGB value after the correction.

In this embodiment, in the case of no overlap area or of a small overlap area, color correction does not need to be performed on images by manually adjusting mechanical positions of cameras and brightness/color parameters of the cameras. Instead, offline and online processing are performed on images shot by the cameras, by using an image processing method such as image data collection and correction. Therefore, in this embodiment, maintenance manpower is saved, adjustment efficiency is improved, and remote maintenance may be performed, in addition, images are corrected in a data processing manner, which efficiently ensures precision of image correction.

It should be understood that for image processing, geometric correction may be performed on cameras first, and then brightness and color correction is performed. In this way, the solutions in Embodiment 2 and Embodiment 3 of the present invention may be used alternately to perform correction. Preferentially, the method in Embodiment 2 may be adopted to perform geometric correction first and then the method in Embodiment 3 is adopted to perform brightness and color correction. In this way, a relatively stable image source may be acquired through geometric correction. This benefits processing of brightness and color correction and avoids a change of brightness or color of an image edge that has been corrected due to an operation such as image rotation during geometric correction.

Figure 13:
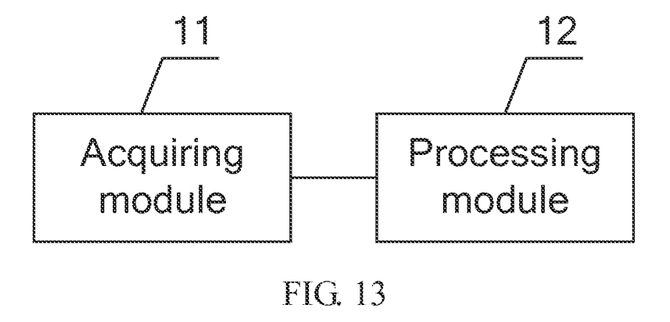
FIG. 13 is a schematic structural diagram of a device her multi-camera image correction according to Embodiment 1 of the present invention.

FIG. 13 is a schematic structural diagram of a device for multi-camera image correction according to Embodiment 1 of the present invention. As shown in FIG. 13, the device in this embodiment may include: an acquiring module 11 and a processing module 12. The acquiring module 11 is configured to acquire information of independent images that are captured by each camera and have no overlap area or have an overlap area smaller than a threshold; and acquire, according to information of each independent image, an image correction parameter that corresponds to each camera and allows adjacent independent images to be corrected into a contiguous image. The processing module 12 is configured to perform, according to the image correction parameter acquired by the acquiring module 11, correction processing on video data of a camera that corresponds to the image correction parameter.

In this embodiment, the acquiring module 11 may be an offline processing device such as a CPU-based computer, and the processing module 12 may be an online processing module, which is implemented in a manner such as DSP, PLD, FPGA, or GPU. The device in this embodiment may accordingly perform the technical solution in method embodiment 1 shown in FIG. 2. Its implementation principle and technical effect are similar to that of the technical solution. Therefore, details are not repeated here.

Figure 14:
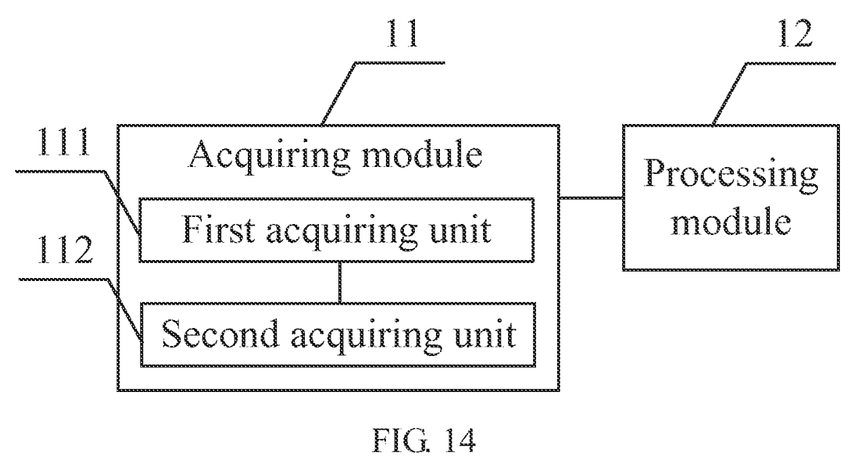
FIG. 14 is a schematic structural diagram of a device for multi-camera image correction according to Embodiment 2 of the present invention.

FIG. 14 is a schematic structural diagram of a device for multi-camera image correction according to Embodiment 2 of the present invention. As shown in FIG. 14, based on the device shown in FIG. 13, an acquiring module 11 in this embodiment specifically includes: a first acquiring unit 111 and a second acquiring unit 112. The first acquiring unit is configured to send a capturing command to an capturing system which each camera belongs to, and receive information of independent images that are captured and sent by the image capturing system which each camera belongs to. The second acquiring unit 112 is configured to acquire, according to the information of independent images received by the first acquiring unit 111, a geometric correction parameter and/or a color correction parameter corresponding to each camera. A processing module 12 is specifically configured to perform correction processing on video data of a corresponding camera according to the geometric correction parameter and/or color correction parameter acquired by the second acquiring unit.

In the case of geometric correction performed on images, the second acquiring unit 112 is specifically configured to perform joint correction processing on information of each independent image, acquire information of each corrected image corresponding to the information of each independent image, where adjacent corrected images are contiguous, and acquire each geometric correction parameter according to the information of each corrected image and information of a corresponding independent image.

In this situation, the device in this embodiment may accordingly perform the technical solution in method embodiment 2 shown in FIG. 3. Its implementation principle and technical effect are similar to that of the technical solution. Therefore, details are not repeated here.

In the case of color correction performed on images, the first acquiring unit 111 is specifically configured to send, to an image capturing system which each camera belongs to, a capturing command for shooting template images, and receive information of template images exposed at multiple exposure time, where the template images are captured and sent by each camera. The second acquiring unit 112 is specifically configured to acquire levels of color component values of each adjacent image area between each camera in each exposure time according to the information of template images exposed at multiple exposure time; perform interpolation processing on the levels of color component values of each image area in each exposure time to acquire a grading curve of color component values of each camera in each exposure time; and acquire a color and brightness correction parameter of each camera according to a target curve and the grading curve of pixel color component values; or is specifically configured to acquire, according to the information of template images exposed at multiple exposure time, levels of color component values of adjacent image areas between multiple image partitions inside each camera in each exposure time; perform interpolation processing on the levels of color component values of each image area in each exposure time to acquire a grading curve of color component values of each image partition in each exposure time; and acquire a color correction parameter of each image partition inside each camera according to a target curve and the grading curve of color component values.

In this situation, the device in this embodiment may accordingly perform the technical solution in method embodiment 3 shown in FIG. 6. Its implementation principle and technical effect are similar to that of the technical solution. Therefore, details are not repeated here.

Persons skilled in the art should understand that all or a part of the steps of the methods in the embodiments may be implemented by a computer program instructing relevant hardware. The program may be stored in a computer readable storage medium. When the program is run, the steps of the methods in the embodiments are performed. The storage medium may be any medium that is capable of storing program codes, such as a ROM, a RAM, a magnetic disk, or an optical disk.

Finally, it should be noted that the above embodiments of the present invention are merely intended for describing the technical solutions of the present invention other than limiting the present invention. Although the present invention is described in detail with reference to the foregoing embodiments, persons skilled in the art should understand that they may still make modifications to the technical solution described in the foregoing embodiments or make equivalent substitutions to some technical features thereof, without departing from the spirit and scope of the technical solution of the embodiments of the present invention.

What is claimed is:

1. A method for performing image correction on multiple independent images, the method comprising:
    acquiring information of the multiple independent images, wherein each of the multiple independent images is captured by one of multiple cameras and wherein no spatial overlap area or a spatial overlap area smaller than a threshold exists between each of the multiple independent images;
    acquiring, according to the information of each of the multiple independent images, multiple image correction parameters, each image correction parameter corresponding to one of the multiple cameras and allowing multiple adjacent independent images to be corrected into a single contiguous image; and
    performing, according to at least one of the multiple image correction parameters acquired according to the information of each of the multiple independent imam, correction processing on video data acquired by at least one of the multiple cameras that corresponds to at least one of the multiple image correction parameters.

2. The method according to claim 1, wherein the acquiring information of the multiple independent images comprises:
    sending a capturing command to an image capturing system to which each of the multiple cameras belongs;
    receiving the information of the multiple independent images from the image capturing system to which each of the multiple cameras belongs; and
    wherein acquiring, according to the information of each of the multiple independent images, the multiple image correction parameters comprises acquiring, according to the information of each of the multiple independent images, at least one of multiple geometric correction parameters each corresponding to one of the multiple cameras and multiple color correction parameters each corresponding to one of the multiple cameras; and
    wherein performing, according to at least one of the multiple image correction parameters acquired according to the information of each of the multiple independent images, correction processing on video data acquired by at least one of the multiple cameras that corresponds to the at least one of the multiple image correction parameters comprises performing, according to at least one of the multiple geometric correction parameters and the multiple color correction parameters, correction processing on the video data acquired by the at least one of the multiple cameras.

3. The method according to claim 2, wherein acquiring, according to the information of each of the multiple independent images, the multiple geometric correction parameters each corresponding to one of the multiple cameras comprises:
    performing joint correction processing on the information of each of the multiple independent images, acquiring information of each of multiple corrected images corresponding to the information of each of the multiple independent images, wherein multiple adjacent corrected images form a single contiguous image, and acquiring each of the multiple geometric correction parameters according to the information of at least one of the multiple corrected images and information of at least one corresponding independent image.

4. The method according to claim 3, wherein the performing joint correction processing on the information of each of the multiple independent images comprises:
    selecting information of one image from the information of the multiple independent images as base image information;
    performing the correction processing on the base image information to produce corrected base image information; and
    using the corrected base image information as reference image information to perform the correction processing on information of each of other independent images.

5. The method according to claim 4, wherein before sending the capturing command to the image capturing system to which each of the multiple cameras belongs, the method further comprises sending a position adjustment instruction to each of the multiple cameras, so that each camera of the multiple cameras is aligned with each of the other cameras of the multiple cameras.

6. The method according to claim 2, wherein sending the capturing command to an image capturing system to which each of the multiple cameras belongs, and receiving the information of the multiple independent images from the image capturing system to which each of the multiple cameras belongs comprises:
    sending, to the image capturing system to which each of the multiple cameras belongs, the capturing command, wherein the capturing command includes a command for shooting template images,
    receiving information of the multiple template images, wherein the multiple template images are captured at multiple exposure times and sent by at least one of the multiple cameras; and
    wherein acquiring, according to the information of each of the multiple independent images, the multiple color correction parameters each corresponding to one of the multiple cameras comprises:
        acquiring, according to the information of the multiple template images, at least one color correction parameter corresponding to at least one of the multiple cameras.

7. The method according to claim 6, wherein acquiring, according to the information of the multiple template images, at least one color correction parameter corresponding to at least one of the multiple cameras comprises:
    acquiring levels of pixel color component values of at least one adjacent image area in each of the multiple exposure times according to the information of the multiple template images;
    performing interpolation processing on levels of pixel color component values of each adjacent image area in at least one of the multiple exposure times to acquire a grading curve of pixel color component values of each camera in the at least one of the multiple exposure times; and
    acquiring a color and brightness correction parameter of the at least one of the multiple cameras according to a target curve and the acquired grading curve of the pixel color component values.

8. The method according to claim 7, wherein the target curve comprises one of the group consisting of:
    (a) a grading curve of the color component values, (b) an average curve of the grading curves of the color component values, and (c) a pixel reference distribution curve.

9. The method according to claim 7, wherein performing correction processing on the video data of the corresponding camera according to the color correction parameter comprises:
    determining a color look up table according to the color correction parameter, and
    performing the correction processing on the video data according to the color look up table.

10. The method according to claim 6, wherein acquiring, according to the information of the multiple template images, at least one color correction parameter corresponding to at least one of the multiple cameras comprises:

acquiring, according to the information of the multiple template images, levels of color component values of at least one adjacent image areas between multiple image partitions inside at least one camera in at least one of the multiple exposure times;

performing interpolation processing on the levels of color component values of the at least one adjacent image area in the at least one exposure time to acquire a grading curve of color component values of at least one image partition in the at least one exposure time; and     acquiring a color correction parameter of the at least one image partition inside the at least one camera according to a target curve and the acquired grading curve of the color component values.

11. The method according to claim 10, wherein the target curve comprises one of the group consisting of:

(a) a grading curve of the color component values, (b) an average curve of the grading curves of the color component values, and (c) a pixel reference distribution curve.

12. The method according to claim 10, wherein performing correction processing on the video data of the corresponding camera according to the color correction parameter comprises:

determining a color look up table according to the color correction parameter, and     performing the correction processing on the video data according to the color look up table.

13. The method according to claim 6, wherein performing correction processing on the video data of the corresponding camera according to the color correction parameter comprises:

determining a color look up table according to the color correction parameter, and     performing the correction processing on the video data according to the color look up table.

14. A device for performing image correction on multiple independent images, the device comprising:

an acquiring module, configured to:

acquire information of the multiple independent images wherein each of the multiple independent images is captured by one of multiple cameras and wherein no spatial overlap area or a spatial overlap area smaller than a threshold exists between each of the multiple independent images, and         acquire, according to the information of each of the multiple independent images, multiple image correction parameters, each image correction parameter corresponding to one of the multiple cameras and allowing multiple adjacent independent images to be corrected into a single contiguous image; and     a processing module, configured to perform, according to at least one of the multiple image correction parameters acquired by the acquiring module according to the information of each of the multiple independent images, correction processing on video data acquired by at least one of the multiple cameras that corresponds to at least one of the multiple image correction parameter.

15. The device according to claim 14, wherein the acquiring module comprises:

a first acquiring unit, configured to send a capturing command to an image capturing system to which each of the multiple cameras belongs and receive the information of the multiple independent images from the image capturing system;

a second acquiring unit, configured to acquire, according to the information of the multiple independent images received by the first acquiring unit, one of: multiple geometric correction parameters, each corresponding to one of the multiple cameras and multiple color correction parameters, each corresponding to one of the multiple cameras; and     wherein the processing module is configured to perform, on the video data acquired by the at least one of the multiple cameras that corresponds to at least one of the multiple image correction parameters, correction processing according to at least one of the multiple geometric correction parameters and the multiple color correction parameters.

16. The device according to claim 15, wherein the second acquiring unit is configured to perform joint correction processing on the information of the multiple independent images, acquire information of multiple corrected images corresponding to the information of the multiple independent images, wherein multiple adjacent corrected images form a single contiguous image, and acquire each of the multiple geometric correction parameters according to the information of at least one of the multiple corrected images and information of at least one corresponding independent image.

17. The device according to claim 15, wherein the first acquiring unit is configured to:

send, to the image capturing system to which each of the multiple cameras belongs, a capturing command for shooting multiple template images, and     receive information of the multiple template images exposed at a multiple exposure time, wherein each of the multiple template images captured and sent by one of the multiple cameras; and     the second acquiring module is configured to:

acquire levels of color component values of each adjacent image area between each camera in each of multiple exposure times according to the information of multiple template images exposed at each of the multiple exposure times;

perform interpolation processing on the levels of color component values of each adjacent image area in each of the multiple exposure times to acquire a grading curve of pixel color component values of each camera in each exposure time; and         acquire a color and brightness correction parameter of each of the multiple cameras according to a target curve and a corresponding grading curve of pixel color component values.

18. The device according to claim 15, wherein the first acquiring unit is configured to:

send, to the image capturing system to which each of the multiple cameras belongs, a capturing command for shooting multiple template images, and     receive information of the multiple template images exposed at a multiple exposure time, wherein each of the multiple template images captured and sent by one of the multiple cameras; and     the second acquiring module is configured to:

acquire, according to the information of the template images exposed at multiple exposure times, levels of color component values of adjacent image areas between multiple image partitions inside each camera in each of the multiple exposure times;

perform interpolation processing on the levels of color component values of each image area in each exposure time to acquire a grading curve of color component values of each image partition in each exposure time; and acquire a color correction parameter of each image partition inside each of the multiple cameras according to a target curve and a corresponding grading curve of color component values.

\* \* \* \* \*

UNITED STATES PATENT AND TRADEMARK OFFICE
CERTIFICATE OF CORRECTION

PATENT NO.      : 9,172,871 B2  
APPLICATION NO. : 13/728380  
DATED           : October 27, 2015  
INVENTOR(S)     : Zhao et al.

Page 1 of 1

It is certified that error appears in the above-identified patent and that said Letters Patent is hereby corrected as shown below:

In The Claims

Column 15, line 18, "imam" should read -- images --.

Signed and Sealed this
Twenty-third Day of February, 2016

Michelle K. Lee
*Director of the United States Patent and Trademark Office*